US005115571A

United States Patent [19]

Mackin

[11] Patent Number: 5,115,571

[45] Date of Patent: May 26, 1992

[54] REVERSIBLE PEN-CALIPER DEVICE AND METHOD

[76] Inventor: Robert A. Mackin, 1033 Lake Point, Flagstaff, Ariz. 86004

[21] Appl. No.: 754,941

[22] Filed: Sep. 4, 1991

[51] Int. Cl.$^5$ .......................... G01B 3/16; G01B 21/20

[52] U.S. Cl. ................................ 33/558.04; 33/27.02

[58] Field of Search ........... 33/558.01, 558.02, 558.03, 33/558.04, 558.05, 558.06, 558.07, 558.08, 558.09, 558.1, 558.2, 558.3, 558.4, 558.5, 27.02; 401/52, 195

[56] References Cited

U.S. PATENT DOCUMENTS

| | | | |
|---|---|---|---|
| 297,492 | 4/188- | Bovensiep | 33/558.04 |
| 1,021,160 | 3/1912 | Morgan | 33/558.07 |
| 1,564,908 | 12/1925 | Sorensen . | |
| 4,388,759 | 6/1983 | Orejola . | |
| 4,720,921 | 1/1988 | Beaudry . | |

*Primary Examiner*—Harry N. Haroian
*Attorney, Agent, or Firm*—Cahill, Sutton & Thomas

[57] ABSTRACT

A pen-caliper device includes a pen assembly having a pen barrel, a ballpoint ink cartridge in the barrel, and a mechanism engaging the ink cartridge and the barrel for advancing the ink cartridge to position a ballpoint of the ink cartridge for writing, and later retracting the ballpoint into the pen barrel. The pen-caliper device also includes a caliper assembly having first and second caliper arms each having a pointed tip. First and second gear elements are attached to pivot ends of the first and second caliper arms, respectively. The first and second gear elements engage each other to cause symmetrical opening and closing of the first and second caliper arms. A snug-fitting rigid sheath is slidable over either the caliper assembly or the pen assembly, so a user can remove the sheath from the caliper assembly to expose the first and second divider arms and slide the sheath over the pen assembly for safe-keeping while using the caliper assembly. The user then can place the sheath over the caliper assembly and retract the ballpoint tip so the pen-caliper can be safely carried in a pocket of user's clothing or the like.

2 Claims, 1 Drawing Sheet

REVERSIBLE PEN-CALIPER DEVICE AND METHOD

BACKGROUND OF THE INVENTION

The invention relates to a pen-caliper device that is especially useful to a physician (or other person) who must make frequent precise measurements on a graph and then make notations regarding the measurements.

A cardiologist frequently carries both a pair of dividers in a sheath and an ordinary ballpoint pen in his or her shirt pocket. When the cardiologist wishes to measure intervals or distances on an electrocardiogram (EKG), he or she removes the dividers from a sheath in which they are inserted to protect the cardiologist from the sharp end points of the pair of dividers. The pair of dividers is deployed to measure distances on the EKG. The sharp end points then are held against a numerical scale to obtain the desired numerical measurement. The cardiologist then removes the ballpoint pen from a pocket of his or her clothing and deploys it to make a corresponding entry on patient records or the like. Frequently, the sheath for the dividers is misplaced and lost. This prevents the cardiologist from putting the dividers in a pocket of his or her clothing because the sharp points poke through the cardiologist's clothing and skin.

U.S. Pat. No. 4,720,921 discloses a pair of dividers used as a navigational instrument, with a channel in the structure for frictionally receiving a writing instrument that can be gripped, removed from the channel, inverted, and reinserted with its writing tip protectively inside the channel. The disclosed navigational device includes various indicia that enable it to function as a protractor and as a distance measuring device. Although the navigational instrument incorporates a writing instrument and a pair of dividers or calipers, it would not be suitable for use by cardiologists, because the divider tips are unprotected by a sheath when not in use, and the writing tip cannot be protected except by removing the writing instrument, inverting it, and reinserting it in the receiving channel, which would be more inconvenient than the present practice of using a separate caliper and sheath and a conventional ballpoint pen. U.S. Pat. No. 4,388,759 discloses a relatively complex EKG caliper with various numerical scales. U.S. Pat. No. 1,564,908 discloses a pair of dividers with a bracket for holding a writing instrument the tip of which is adjacent to one of the sharp points of the pair of dividers. None of the foregoing devices can be used conveniently by a cardiologist without causing problems even more disconcerting than those described above for a conventional ballpoint pen and pair of dividers in a sheath.

It would be very desirable for cardiologists and others to have a single instrument for both measuring EKGs or the like and making notations, while avoiding the foregoing difficulties.

SUMMARY OF THE INVENTION

It is an object of the invention to provide a pen-caliper device that can be safely carried in a shirt pocket without poking through the clothing and skin of the user, can be used as a caliper to measure distances on a chart or the like, and then reversed and utilized as a pen to make corresponding notations.

Briefly described, and in accordance with one embodiment thereof, the invention provides a pen-caliper device including a pen assembly having a pen barrel, a ballpoint ink cartridge in the barrel, and a mechanism engaging the ink cartridge and the barrel to advance the ink cartridge when the pen barrel is rotated so as to position a ballpoint tip of the ink cartridge for writing. The mechanism also effectuates retracting of the ballpoint tip into the pen barrel when the pen barrel is rotated in the opposite direction. The device includes a caliper assembly having first and second caliper arms each having a pointed tip and first and second gear elements attached to pivot ends of the first and second caliper arms, respectively. The first and second gear elements engage each other to cause symmetrical opening and closing of the first and second caliper arms. A pivot support is attached to an end of the pen assembly to support first and second pivot elements which pivotally connect the pivot ends of the first and second caliper arms to the pivot support. A rigid sheath slides over either the caliper assembly or the pen assembly. A user can remove the sheath from the caliper assembly to expose the first and second caliper arms and slide the sheath over the pen assembly for safe-keeping while using the caliper assembly. The user later can place the sheath over the caliper assembly and retract the ballpoint tip so the pen-caliper can be safely carried in a pocket of a user's clothing or the like.

DETAILED DESCRIPTION OF THE PREFERRED EMBODIMENT

Figure 1:
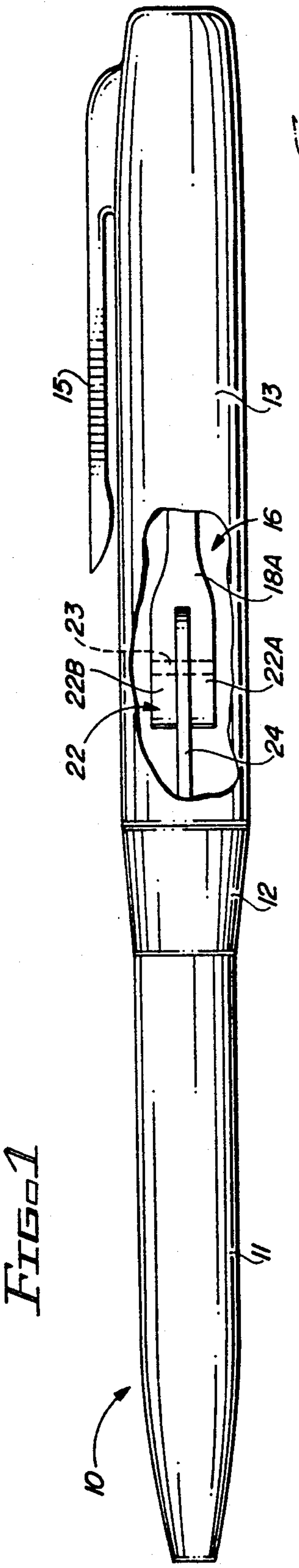
FIG. 1 is a partial cutaway view of the pen-caliper device of the invention.

Referring to the drawings, pen-caliper 10 includes a ballpoint pen assembly 11 threaded onto the left end of a ferrule 12. A removable rigid sheath 13 fits slidably over a caliper assembly 16 which is attached to the right end of ferrule 12. A pocket clip 15 is attached to the right end portion of cover 13.

The ballpoint pen assembly 11 includes a pen barrel 33 having an elongated cavity 35 therein. A standard ink cartridge 36, such as a Fisher ballpoint tip cartridge, is slidably positioned in cavity 35. A bulge 36A in ballpoint cartridge 36 functions as a stop for the right end of a helical compression spring 37, the left end of which abuts a shoulder 34 in the distal end portion of pen barrel 33. Compression spring 37 urges cartridge 36 into cavity 35.

The right open end of pen barrel 33 has inner surface helical threads at 33A which mate with similar outer surface helical threads on the left hand portion of a ferrule 28. Pen barrel 33 therefore can be unscrewed from ferrule 28 to allow replacement of ink cartridge 36.

Ferrule 28 has an inner bore with helical threads at 30 which engage mating helical threads 30A on the outer surface of a cartridge holder 31. The left end of cartridge holder 31 has a recess that holds the right end of ink cartridge 36.

The right end of ferrule 28 is rotatably disposed on a stationary bearing/retainer element 26A which is attached to and integral with a support element 26. Support element 26 supports an arm 24 which extends between bifurcated gear sections 21 and 22 of caliper arm 18A of caliper section 16. As shown in FIG. 1, bifurcated gear section 22 includes two separated gears 22A and 22B. Bifurcated gear section 21 includes two similarly separated gears.

Caliper arm 17A and bifurcated gear section 21 rotate about a pivot pin 29 that extends through arm 24 and bifurcated gear section 21. Similarly, caliper arm 18A and bifurcated gear section 22 rotate about a pivot pin 23 that extends through arm 24 and between the bifurcated gear section 22. The right ends of caliper arms 17A and 18A each have a pointed needle or pin 20 attached thereto, as illustrated in FIG. 2.

The teeth of bifurcated gear section 21 mesh with the teeth of bifurcated gear section 22 so that when either of caliper arms 17A or 18A is pivoted, the other arm symmetrically pivots an equal amount in the opposite direction by virtue of the gearing. Dotted lines 17B and 18B and arrows 19 indicate such pivoting.

Figure 2:
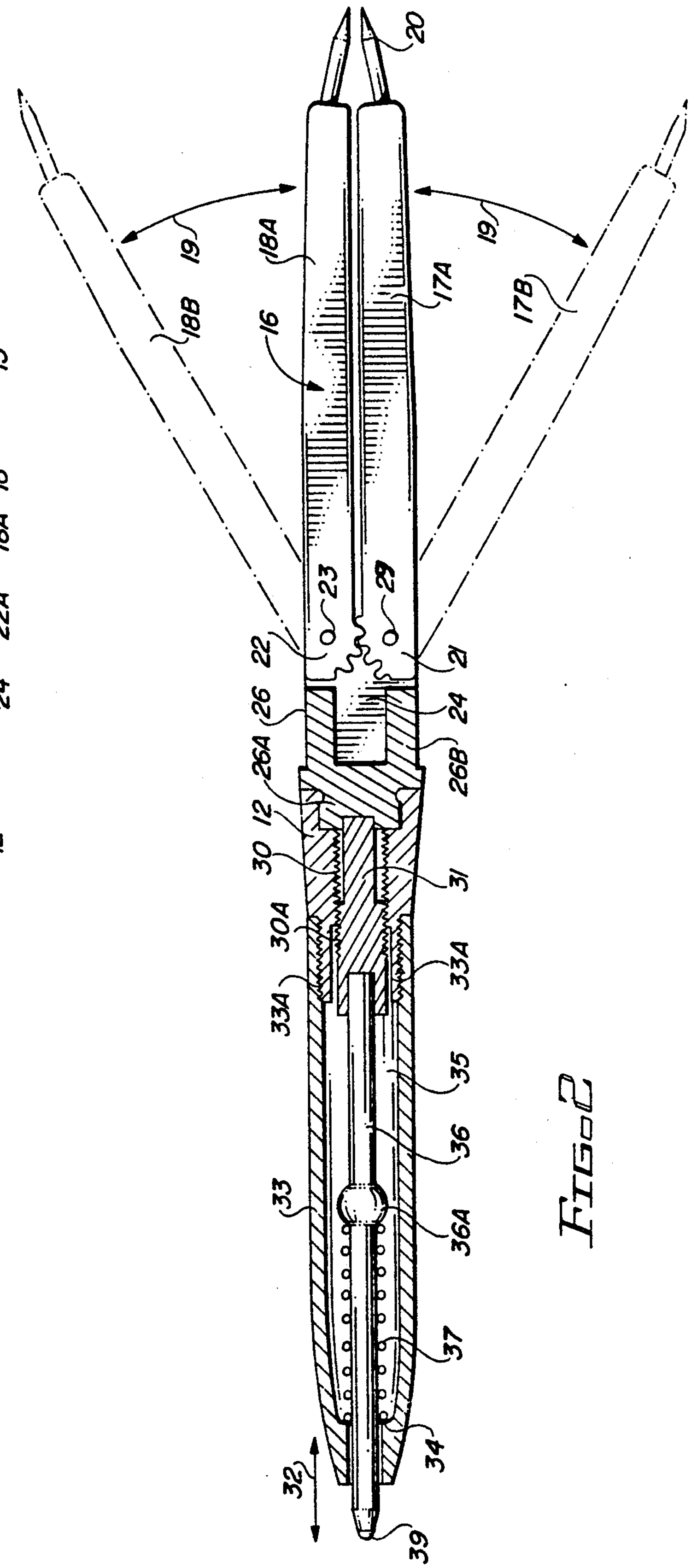
FIG. 2 is a section view diagram illustrating both a closed and an open configuration of the pen-caliper device of FIG. 1.

As suggested by FIG. 2, sheath 13 can be removed to expose caliper section 16. Sheath 13 then can be slid snugly over the pen barrel 33 while the physician is using the calipers. Sheath 13 snugly fits over either caliper assembly 16 or pen assembly 11. When the caliper measurement has been made, cover sheath 13 is removed from the pen barrel 11, caliper arms 17A and 17B are pivoted closed, and sheath 13 is replaced thereon. Pen barrel 11 and ferrule 28 are rotated a quarter of a turn so that the helical gear arrangement at 30 advances the ink cartridge 36 to the left to expose ballpoint tip 39 so that the physician can conveniently make the necessary notations. Ballpoint tip 39 then is retracted by rotating the ferrule in the opposite direction, and the pen-caliper device can be placed in the physician's pockets and clipped therein by means of pocket clip 15. Arrows 32 show the directions of advancing and retracting ballpoint tip 39.

The above-mentioned problem of misplacing the sheath of prior art calipers is avoided by pen-caliper 10. The inconvenience of having to carry two separate implements, a ballpoint pen and a pair of dividers or calipers, also is avoided by provision of cover sheath 13 that fits over either the pen section or the caliper section, in combination with the retractable ballpoint mechanism.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, it should be understood that the foregoing ballpoint pen mechanism is just exemplary. Various other mechanisms for advancing and retracting the ballpoint cartridge tip could be used. In an embodiment of the invention presently under development, a cam surface of one member affixed to the caliper section engages a pin of another member that advances and retracts the pen cartridge when the pen barrel is rotated.

What is claimed is:

1. A pen-caliper device, comprising in combination:

(a) a pen assembly including
  i. a pen barrel,
  ii. a ballpoint ink cartridge in the barrel,
  iii. means engaging the ink cartridge and the barrel for advancing the ink cartridge to position a ballpoint of the ink cartridge for writing and retracting the ballpoint into a protected position inside the pen barrel;

(b) a caliper assembly including
  i. first and second caliper arms each having a pointed tip and a pivot end,
  ii. first and second gear elements attached to the pivot ends of the first and second caliper arms, respectively, the first and second gear elements engaging each other to cause symmetrical opening and closing of the first and second caliper arms,
  iii. a pivot support attached to an end of the pen assembly, and first and second pivot elements pivotally connecting the pivot ends of the first and second caliper arms to the pivot support; and (c) a rigid sheath snugly slidable over either the caliper assembly or the pen assembly, whereby a user can remove the sheath from the caliper assembly to expose the first and second divider arms, slide the sheath over the pen assembly for safe-keeping while using the caliper assembly, place the sheath over the caliper assembly, advance the ballpoint to make notations, and retract the ballpoint tip so the pen-caliper can be safely carried in a pocket of a user's clothing or the like.

2. The pen-caliper of claim 1 including a pocket clip attached to the sheath.

* * * * *